(12) United States Patent
Baun et al.

(10) Patent No.: US 10,273,939 B2
(45) Date of Patent: Apr. 30, 2019

(54) CONTROL SYSTEM FOR DAMPING STRUCTURAL VIBRATIONS OF A WIND TURBINE SYSTEM HAVING MULTIPLE ROTORS

(71) Applicant: VESTAS WIND SYSTEMS A/S, Aarhus N (DK)

(72) Inventors: Torben Ladegaard Baun, Skødstrup (DK); Erik Carl Lehnskov Miranda, Randers SV (DK); Erik Sloth, Rønde (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/550,312

(22) PCT Filed: Feb. 12, 2016

(86) PCT No.: PCT/DK2016/050041
§ 371 (c)(1),
(2) Date: Aug. 10, 2017

(87) PCT Pub. No.: WO2016/128004
PCT Pub. Date: Aug. 18, 2016

(65) Prior Publication Data
US 2018/0017042 A1 Jan. 18, 2018

(30) Foreign Application Priority Data

Feb. 12, 2015 (DK) .................................. 2015 70081

(51) Int. Cl.
*F03D 1/02* (2006.01)
*F03D 7/02* (2006.01)
(Continued)

(52) U.S. Cl.
CPC ............. *F03D 7/0296* (2013.01); *F03D 1/02* (2013.01); *F03D 7/024* (2013.01); *F03D 7/028* (2013.01);
(Continued)

(58) Field of Classification Search
CPC .......... F03D 1/02; F03D 7/0224; F03D 7/024; F03D 7/028; F03D 7/0296; F03D 9/25;
(Continued)

(56) References Cited

U.S. PATENT DOCUMENTS 7,293,960 B2 * 11/2007 Yamamoto ................ F03D 1/02
416/85
7,851,934 B2 * 12/2010 Nyborg .................. F03D 7/0224
290/44

(Continued)

FOREIGN PATENT DOCUMENTS

EP 1483501 A2 12/2004
GB 2443886 A * 5/2008 ............... F03D 1/02
JP 2005351087 A 12/2005

OTHER PUBLICATIONS

International Search Report for PCT/DK2016/050041, dated Apr. 29, 2016.
Danish Search Report for PA 2015 70081, dated Sep. 11, 2015.

*Primary Examiner* — Abdullah A Riyami
*Assistant Examiner* — S. Mikailoff
(74) *Attorney, Agent, or Firm* — Patterson + Sheridan, LLP

(57) ABSTRACT

A wind turbine system comprising a plurality of wind turbines mounted to a support structure including a tower, wherein each of the plurality of wind turbines includes a rotor and a power generation system driven by the rotor, and at least one of a rotor blade pitch adjustment means and a generator power control means. The system further includes control means that receives vibration data associated with (Continued)

the support structure and which is configured to determine a damping control command for a respective one of the plurality of wind turbines, wherein the or each of the wind turbines includes a damping controller that receives a damping control command and which is operable to apply a damping control input to one or both of the blade pitch adjustment means and the generator power control means so as to counteract the measured vibration of the support structure. A benefit of the invention is that the operation of the multiple turbines of the system is used to reduce the effects of structural vibration by damping that vibration in an active manner.

20 Claims, 5 Drawing Sheets

(51) Int. Cl.
*F03D 9/25* (2016.01)
*H02K 7/18* (2006.01)
*H02P 9/04* (2006.01)

(52) U.S. Cl.
CPC ............ *F03D 7/0224* (2013.01); *F03D 9/25* (2016.05); *H02K 7/1838* (2013.01); *H02P 9/04* (2013.01); F03D 7/0276 (2013.01); F05B 2240/221 (2013.01); F05B 2240/912 (2013.01); F05B 2260/964 (2013.01); F05B 2270/111 (2013.01); F05B 2270/327 (2013.01); F05B 2270/334 (2013.01); F05B 2270/335 (2013.01); Y02E 10/723 (2013.01); Y02E 10/725 (2013.01); Y02E 10/728 (2013.01)

(58) Field of Classification Search
CPC .......... F05B 2240/221; F05B 2240/912; F05B 2260/964; F05B 2270/111; F05B 2270/327; F05B 2270/334; F05B 2270/335; H02K 7/1838; H02P 9/04
See application file for complete search history.

(56) References Cited

U.S. PATENT DOCUMENTS

| | | | | |
|---|---|---|---|---|
| 7,911,072 | B2* | 3/2011 | Nyborg | F03D 7/0224 290/44 |
| 8,487,462 | B2* | 7/2013 | Nyborg | F03D 7/0224 290/44 |
| 8,598,727 | B2* | 12/2013 | Nyborg | F03D 7/0224 290/44 |
| 2003/0170123 | A1* | 9/2003 | Heronemus | F03D 1/02 416/41 |
| 2006/0066111 | A1 | 3/2006 | Suryanarayanan et al. | |
| 2007/0176428 | A1* | 8/2007 | Nagao | F03D 7/0296 290/44 |
| 2011/0040414 | A1* | 2/2011 | Nyborg | F03D 7/0224 700/280 |
| 2013/0230396 | A1* | 9/2013 | Wakasa | F03D 7/0224 416/1 |
| 2014/0003936 | A1* | 1/2014 | Agarwal | F03D 7/02 416/1 |
| 2015/0003984 | A1* | 1/2015 | Pineda Amo | F03D 7/0296 416/1 |
| 2017/0184077 | A1* | 6/2017 | Caponetti | F03D 17/00 |
| 2017/0234300 | A1* | 8/2017 | Brodsgaard | F03D 7/0296 416/1 |
| 2018/0100487 | A1* | 4/2018 | Yamamoto | F03D 7/0224 |

* cited by examiner

CONTROL SYSTEM FOR DAMPING STRUCTURAL VIBRATIONS OF A WIND TURBINE SYSTEM HAVING MULTIPLE ROTORS

TECHNICAL FIELD

The invention relates to a control system of a wind turbine system having multiple rotors and more particularly, but not exclusively, to a control system for damping structural vibrations of a multi-rotor wind turbine system.

BACKGROUND TO THE INVENTION

The most common type of wind turbine is the three-bladed upwind horizontal-axis wind turbine (HAWT), in which the turbine rotor is at the front of the nacelle and facing the wind upstream of its supporting turbine tower.

There exist a number of alternative wind turbine designs. One example is the multi-rotor array type wind turbine.

EP1483501B1 discloses a multi-rotor array-type wind turbine in which a plurality of co-planar rotors are mounted to a common support structure. Such a configuration achieves economies of scale that can be obtained with a very large single rotor turbine, but avoids the associated drawbacks such as high blade mass, scaled up power electronic components and so on. However, although such a co-planer multi-rotor wind turbine has its advantages, it presents challenges to implement the concept in practice, particularly in how to control the multiple rotors to achieve optimum power production and how best to manage the complex vibrational modes generated in the support structure by virtue of the multiple rotors.

SUMMARY OF THE INVENTION

It is against this background that the invention provides a wind turbine system comprising a plurality of wind turbines mounted to a support structure including a tower, wherein each of the plurality of wind turbines includes a rotor and a power generation system driven by the rotor, and at least one of a rotor blade pitch adjustment means and a generator power control means. The system further includes control means that receives vibration data associated with the support structure and which is configured to determine a damping control command for a respective one of the plurality of wind turbines, wherein the or each of the wind turbines includes a damping controller that receives a damping control command and which is operable to apply a damping control input to one or both of the blade pitch adjustment means and the generator power control means so as to counteract the measured vibration of the support structure.

A benefit of the invention is that the operation of the multiple turbines of the system is used to reduce the effects of structural vibration by damping that vibration in an active manner.

Embodiments of the invention may be used to implement active damping to counteract vibration in many different modes. However, in particular, one or more of the wind turbines are configured to control the generation system in order to damp sideways vibration of the tower, in a direction that is transverse to the wind direction. Similarly, one or more of the wind turbines are configured to control the pitch of the blades collectively in order to damp vibration of the tower in a direction substantially in line with the wind direction. Furthermore, one or more of the wind turbines are configured to control the pitch of the blades cyclically in order to damp vibration of the tower in a direction that is transverse to the wind direction. The aforementioned approaches can be combined as appropriate to combat complex vibrational modes.

In the illustrated embodiment, each of the plurality of wind turbines is coupled to the tower by a support arm so that the wind turbine is spaced away from the tower, and wherein one or more of the wind turbines are configured to control the yawing force applied to the support arm by its respective wind turbine.

In one embodiment, the plurality of wind turbines are controlled in groups, such that one or more of the wind turbines in a first group positioned on one side of the tower are controlled to generate a force along their respective rotor axes and wherein one or more of the wind turbines in a second group positioned on the other side of the tower from the first group are controlled to generate a force along their respective axes that is less than or opposite to the corresponding force generated by the wind turbines in the first group. This results in the wind turbines yawing about the tower by using differential thrust of the turbines on opposite sides of the tower.

The system may include vibration detection means located on the support structure to detect vibrations thereof, the vibration means being configured to provide vibration data to the control means. The vibration detection means include at least one of a set of one or more accelerometers and a set of one or more load sensors applied to appropriate sites on the support structure so as to measure vibrational modes accurately.

In a further aspect there is provided a method of a wind turbine system in accordance with the first aspect of the invention.

It will be appreciated that preferred and/or optional features of the first aspect of the invention may be incorporated alone or in appropriate combination in the second aspect of the invention also.

BRIEF DESCRIPTION OF THE DRAWINGS

So that it may be more fully understood, the invention will now be described by way of example only to the following drawings, in which.

DETAILED DESCRIPTION OF EMBODIMENTS OF THE INVENTION

Figure 1:
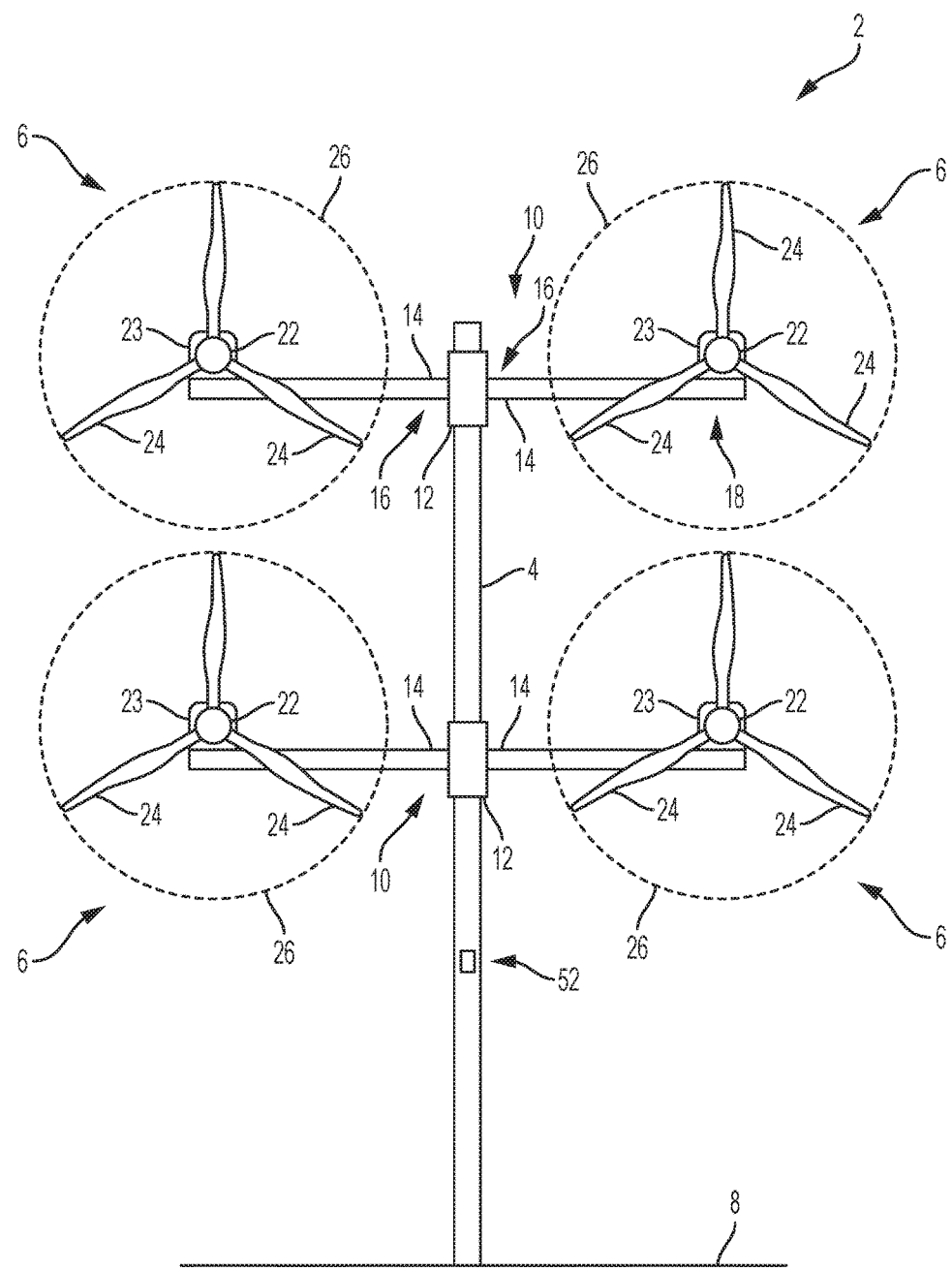
FIG. 1 is a front view of a multi-rotor wind turbine system or 'installation'.
Figure 2:
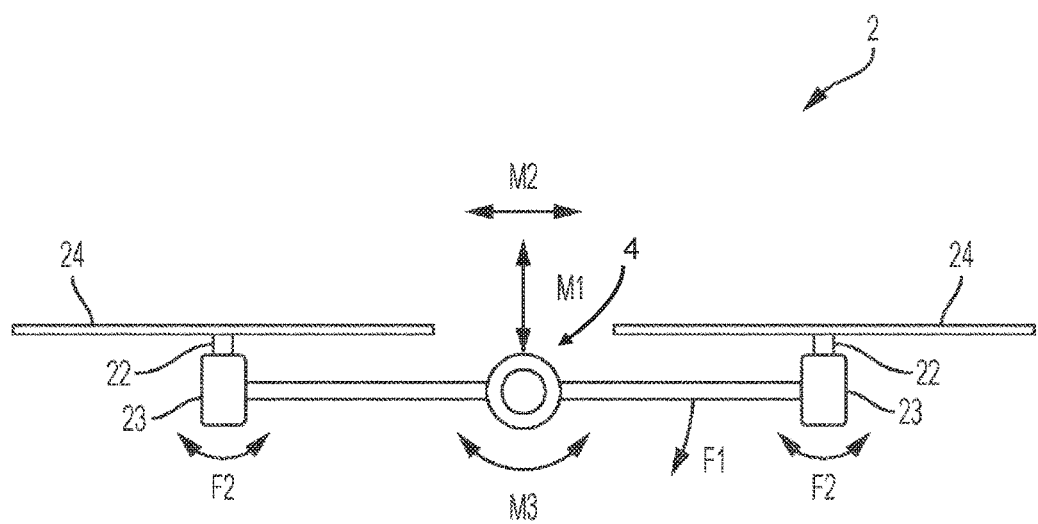
FIG. 2 is a top view of the multi-rotor wind turbine system in FIG. 1, which also shows oscillatory modes of the wind turbine installation.

With reference to FIGS. 1 and 2, a wind turbine installation or 'system' 2 includes a tower 4 on which is mounted a plurality of wind turbines 6 or wind turbine modules 6. The entire wind turbine system 2 is supported on a foundation 8, as is usual. Note that the term 'wind turbine' is used here in the industry-accepted sense to refer mainly to the generating components of the wind turbine installation and as being separate to the tower 4. Note that the foundation may be a large mass buried in the ground, as shown here, or in the form of monopole or 'jacket' like structures in offshore installations.

In this embodiment, there are four wind turbines 6, and these are mounted to the tower 4 in two pairs, each pair including two wind turbines 6 that are mounted to the tower 4 by a support arm arrangement 10.

The support arm arrangement 10 comprises a mount portion 12 and first and second arms 14 that extend from the mount portion and carry a respective wind turbine 6. As such, each of the support arms 13 includes an inner end 16 connected to the mount portion 12 and an outer end 18 that is connected to a wind turbine 6.

The support arm arrangement 10 is mounted to the tower 4 at the mount portion 12 so that the support arm arrangement 10 is able to yaw about the vertical axis of the tower 4. Suitable yaw gearing (not shown) is provided for this purpose. This movement provides a first degree of freedom for the wind turbine 6 with respect to the tower 4, as shown on FIG. 2 as 'F1'. This arrangement may be referred to as a central yaw arrangement. Although this embodiment includes yaw gearing, other embodiments are envisaged in which the support arm arrangements 10 do not yaw relative to the tower 4. In an embodiment, also yaw units for the individual turbines may be provided in order to yaw each wind turbine module as indicated by F2 on the figure.

Together, the tower 4 and the support arm arrangement 10 can be considered to be a support structure for each of the wind turbines 6.

Each wind turbine 6 includes a rotor 22 that is rotatably mounted to a nacelle 23 in the usual way. The rotor 22 has a set of three blades 24 in this embodiment. Three-bladed rotors are a common rotor configuration, but different numbers of blades may also be used. Thus, each of the wind turbines 6 are able to generate power from the flow of wind that passes through the swept area or 'rotor disc' 26.

During operation, the tower 4 may be exposed to a number of forces which causes it to oscillate (It is also from external sources). With reference to FIG. 2, it can be seen that the tower 4 is able to sway back and forth, and also side to side, thereby giving rise to multiple modes of oscillation, including modes M1 and M2 respectively. The tower 4 may also experience torsional excitation, due to wind action but also due to any thrust imbalances between individual ones of the wind turbines 6, which gives rise to another mode of oscillation, shown as M3, and, moreover, each of the support arms may oscillate in the horizontal direction (perpendicular to the paper plane) and also vertically. The oscillation of the support structure leads to fatigue which may impact the service life of the installation as a whole. The invention provides a solution to this, in that the wind turbines 6 are controlled to counteract the oscillations experienced by the installation, in effect providing active damping to the oscillatory system.

Embodiments of such active damping is achieved will now be described in more detail.

FIGS. 1 and 2 show the main structural components of the wind turbine system 2, although the skilled person would understand that the illustrated embodiment has been simplified in order not to obscure the invention with unnecessary detail. Further explanation will now be provided on the system components of the wind turbine system 2 with reference also to FIG. 3.

On a systems level, each wind turbine 6 may include a gearbox 30 that is driven by the rotor 22, and a power generation system 31 including a generator 32 connected to the gearbox 30 and which feeds generated power to a converter system 34. A pitch control system 36 is also provided to control the angle of attack of the blades relative to the wind. The precise configuration of the generator 32 and converter system 34 are not central to the invention and will not be described in detail here. However, for present purposes they can be considered to be conventional and, in one embodiment, may be based on a full scale converter (FSC) architecture or a doubly fed induction generator (DFIG) architecture. Furthermore, each of the wind turbines can be considered to be substantially identical, so only one has been labelled fully in FIG. 3 for clarity. However, it should be noted that embodiments are envisaged in which the wind turbines are not identical to one another.

In the illustrated embodiment, the power output of the converter 34 of each wind turbine 6 is fed to a distribution unit 40 which has a function to receive power inputs 42 from the wind turbines 6 over suitable cabling 44 for onward transmission to a load 46, which is shown here as the electrical grid. Although not shown here, it should be appreciated that the distribution unit 40 may be located in any suitable position, for example within the tower 4. The skilled person would be aware that different power conversion and transmission options exist, and it would be within the abilities of the skilled person to specify a suitable system. Thus, this aspect is not described in more detail here.

It should be noted at this point that only a single wind turbine system 2 is described here, but that several such installations may be grouped together to form a wind power plant, also referred to as a wind farm or 'park'. In this case, a wind plant control and distribution facility (not shown) would be provided to coordinate and distribute the power outputs from the individual wind turbine systems to the wider grid.

Since the wind turbine system 2 includes a plurality of wind turbines 6, each of which is operable to generate electrical power as the rotor 22 is driven by the wind, the wind turbine system 2 includes localised control means 49 that is operable to monitor the operation of respective ones of the plurality of wind turbines 6 and to issue commands thereto to achieve a set of local control objectives. In this embodiment, the localised control means 49 is provided in the form of a plurality of local control modules 50 that are embodied as respective computing devices each of which is dedicated to an associated wind turbine 6. One such control objective is to monitor rotor speed and power output and to control the pitch control system 36 and the generator 32 in line with a locally stored power-speed relationship curve that is specific for that particular wind turbine 6 in order to ensure that maximum power is extracted from the wind during below-rated and above-rated operating conditions, as will be explained in more detail later.

Although each of the wind turbines 6 includes a local control module 50, the wind turbine system 2 also includes a centralised control means 51 which serves a supervisory function in order to provide a coordinated control strategy. In this embodiment, the centralised control means 51 is provided by a central control module 52 being a computing device incorporated in the distribution unit 40. Here, the central control module 52 is located on the tower 4, although it is envisaged that other locations would be acceptable. As will be explained, the central control module 52 is configured to monitor the operation of the wind power system 2, that is to say the wind turbines 6 and the tower 4, and to provide centralised control commands to the plurality of wind turbines 6 in order to achieve a supervisory control objective.

Local Wind Turbine Control

As is known, variable-speed wind turbines typically operate under two main control strategies: below-rated power and above-rated power, although other operational strategies are known. The term 'rated power' is used here in its accepted sense to mean the power output at which the wind turbine system is rated or certified to produce under continuous operation. Similarly, the use of the term 'rated wind speed' should be understood to mean the lowest wind speed at which the rated power of a wind turbine is produced.

Below rated power occurs at wind speeds between the cut-in speed and rated wind speed which, typically, is between 10 m/s and 17 m/s. In this operating region, the local control module 50 is operable to control the rotor speed so as to maximise the energy captured from the wind. This is achieved by controlling the rotor speed so that the tip speed ratio is at an optimum value, namely between 6 and 7. To control the rotor speed, the local control module 50 is provided with the facility to control the generator torque to track a commanded power reference, as will be described.

Above-rated power occurs when the wind speed has increased to, or has exceeded, the rated wind speed. In this operating condition, the objective of the local control module 50 is to maintain a constant output power. This is achieved by controlling the generator torque, or power, to be substantially constant, but varying the pitch angle of the blades which adjusts the resulting drag and lift forces in the rotor plane. This will transfer negative torque to the rotor shaft thereby ensuring that the rotational speed or the torque is kept below a set threshold.

Figure 4:
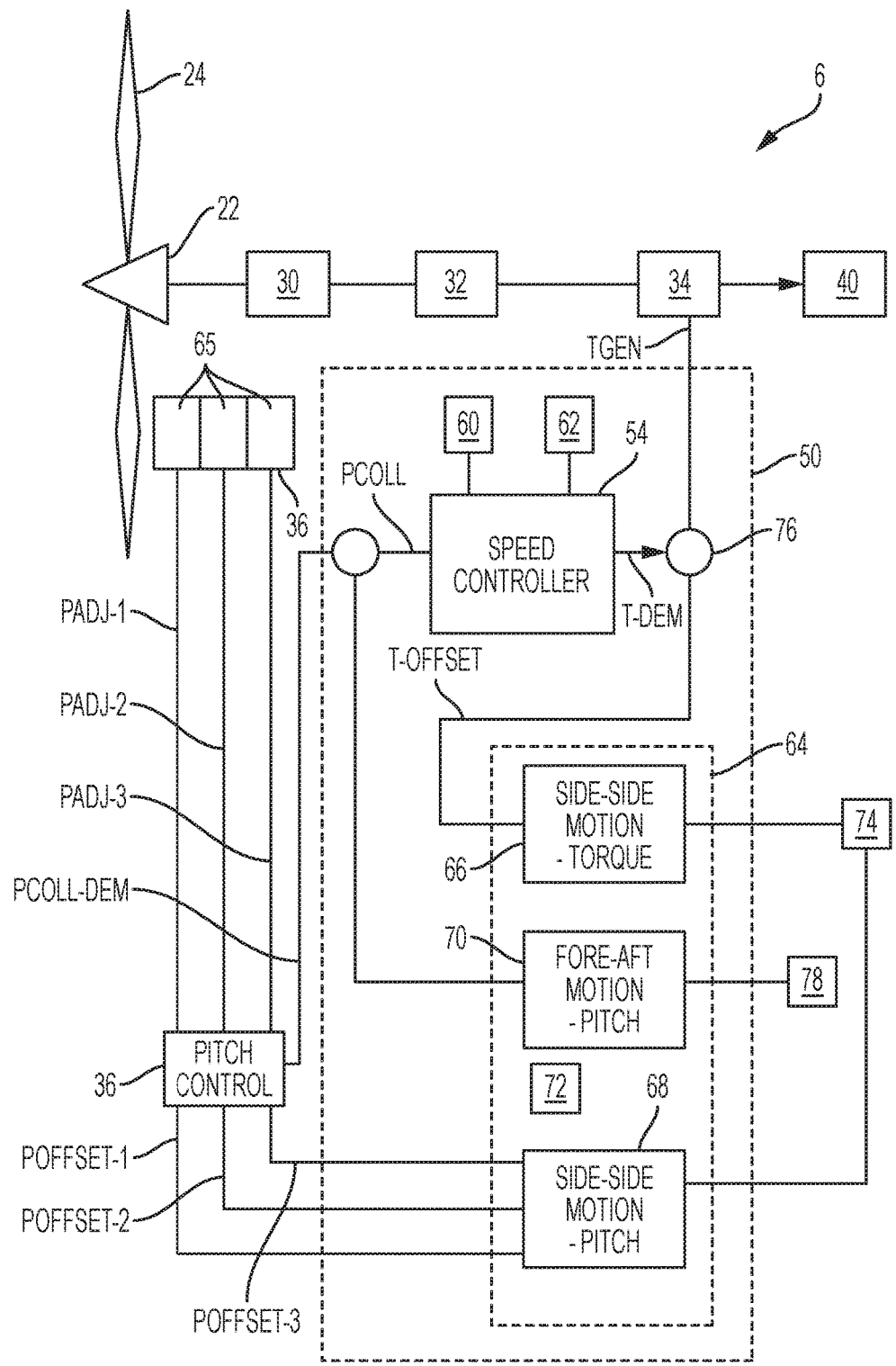
FIG. 4 is a more detailed view of a local control system of one of the wind turbines of the multi-rotor system in FIG. 3.

FIG. 4 provides a more detailed view of one of the wind turbines 6, and particularly the local control module 50. In order to achieve the below-rated power and above-rated power control objectives, the local control module 50 includes a speed controller 54 which is operable to control the converter system 34 to influence the torque exerted on the rotor 22 by the generator 32, and also to control the pitch of the blades 24 through the pitch control system 36.

The speed controller 54 receives a plurality of control inputs, but two input parameters are shown specifically here: a rotor speed input parameter 60 which is provided by a suitable rotor speed sensing means (not shown), and a demanded power input parameter 62 or 'power reference' which is provided by a higher level controller, for example the central control module 52, of the wind turbine system 2.

The speed controller 54 is operable to control the generator torque by outputting a demanded torque signal $T_{DEM}$ to the converter system 34 during below-rated power operating condition in order to minimise the error between the rotor speed input parameter 60 and the power reference 62 and, thus, to bring the generated power to match the power reference 62. Similarly, at operating conditions above-rated power, the speed controller 54 is operable to hold the generator torque constant but to provide a control input to the pitch control system 36 to modulate, collectively, the pitch angles of all three blades 24 of the rotor 22. The pitch control system 36 receives the control input from the speed controller 54, shown here as $P_{COLL\_DEM}$ and converts this into a pitch angle adjustment value for each of the blades 24. The pitch angle adjustment values are shown here as $P_{ADJ\_1}$ $P_{ADJ\_3}$ and $P_{ADJ\_3}$ that represent values for a three bladed rotor. These control inputs are fed to pitch actuators 65 which control the pitch for the respective blades 22.

At this point it should be noted that although the pitch control system 36 has been described here as implementing individual pitch adjustments for all of the blades, in other embodiments it may be the cases that only a single pitch adjustment signal is sent that is only able to vary blade pitch collectively.

Figure 3:
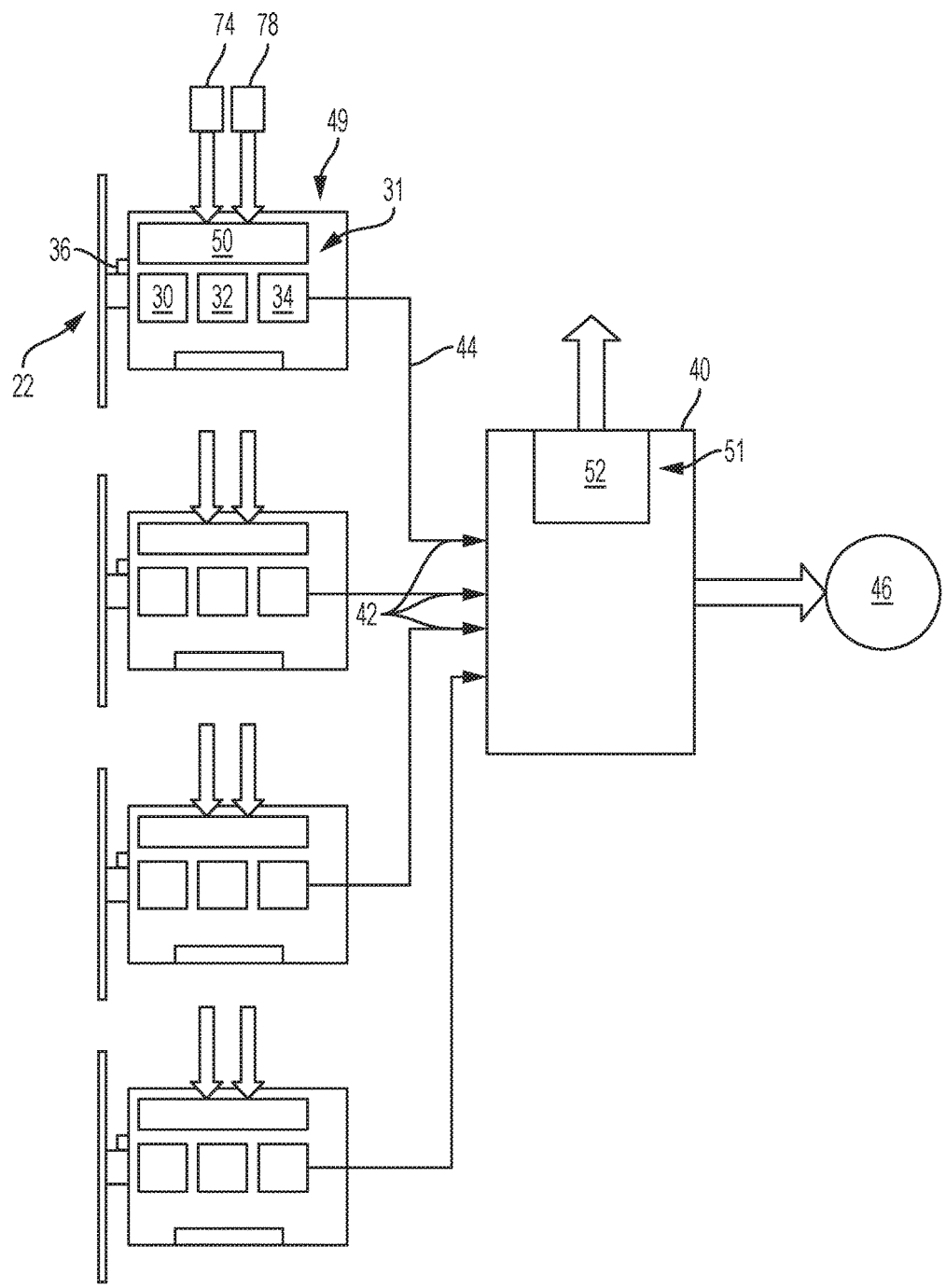
FIG. 3 is a schematic view of an embodiment of a central control system for the multi-rotor wind turbine installation of FIGS. 1 and 2.

Although only one of the wind turbines 6 is described in FIG. 3, it should be appreciated that each of the wind turbines 6 can be considered identical for the purposes of this discussion.

As will be appreciated from the above discussion, each wind turbine 6 is provided with a facility to control the rotor speed during a wide range of wind speeds in order to optimise the power generation of the system. However, as will be explained, the speed control function of the wind turbine 6 may be used to control the forces exerted on the support arm arrangement 10 and tower 4 by the wind turbines 6, thereby acting as a means of reducing the oscillation of those structures.

To this end the local control module 50 includes a damping controller 64 which cooperates with the speed controller 52, as will be explained, in order to apply forces into the rotor 22 via the generator system 32 and the blade pitch control system 34 in order to counter the oscillation of the tower.

The damping function may be split between the central control module 52, which monitors the support structure via a suitable sensor suite and determines damping inputs that are required to counteract the motion of the support structure, and the local control modules 50. The local control modules 50 receive the control commands from the central control module 52 and converts the damping commands into specific pitch control and torque control inputs.

Before describing how the central control module determines the required damping commands, firstly it will be described how the damping commands are implemented at the local level within a wind turbine 6.

Control of Excitation at Wind Turbines

As can be seen in FIG. 4, the damping controller 64 includes three main modules, which are a lateral motion torque damping module 66, a lateral motion pitch damping module 68, and an axial motion pitch damping module 70. The damping controller 64 also includes a supervisory module 72 which controls the activation of each of the aforementioned modules 66, 68, 70. It should be noted at this point that the lateral motion pitch damping module 68 would not be necessary in embodiment in which the wind turbine is configured to make collective pitch adjustments only.

At this point it should be noted that although the modules 66, 68, 70 have been described as being separate, this is not intended to confer a particular physical structure on the modules. For example, the modules may be separate firmware units or they may be individual functional software units implemented on a common processing platform. Also it should be noted that although modules 66, 68, 70 may be operated simultaneously, it may also be appropriate for them to be operated separately. For instance, the lateral motion torque damping module 66 tends to be more effective when operating at partial load conditions, that is to say at below rated power, whilst the lateral motion pitch damping module 68 and the axial motion pitch damping module 70 tend to be more effective when operating at full load conditions, that is to at or above rated power.

The lateral motion torque damping module 66 receives as lateral damping input signal 74 which is provided to it from the central control module 52, as will be explained later. In response to the input signal 74, the lateral motion torque damping module 66 is operable to output a torque offset signal $T_{OFFSET}$ which serves to modulate the output of the speed controller 54 at summing junction 76. The modulated signal is provided to the converter system 34, via a generated torque signal $T_{GEN}$, which may also be referred to as a modulated power reference signal, which controls the generator 32 accordingly. References herein to 'power control' of the generator can therefore be considered to by synonymous with torque control.

The lateral motion pitch damping module 68 and the axial motion pitch damping module 70 in this embodiment are operable during above-rated power operating conditions and complement the functionality of the speed controller 54 to damp a different oscillatory mode of the tower. Both of these damping modules 66,68 operate together via the pitch control system 36 to control the pitch of the blades, as will now be explained.

The axial motion damping module 70 functions to damp the oscillations of the tower in a direction in line with the rotor axis; that is to say the 'fore-aft' oscillatory mode of the tower, as illustrated as M1 in FIG. 2. In order to do this, the module 70 receives as an axial damping signal 78 from the central control module 52.

In more detail, the axial motion damping module 70 calculates the collective pitch change that is required to cause the rotor to apply a force to the nacelle that is counter to the fore-aft motion. Thus, the module 70 outputs a collective pitch offset that modulates the collective pitch demand $P_{COLL}$ signal that is output by the speed controller 22 at summing junction 60. The modulated collective pitch demand $P_{COLL\_DEM}$ is then provided to the pitch control system 36.

Conversely, the lateral motion pitch damping module 68 functions to damp the oscillations of the tower in a direction that is transverse to the rotor axis; that is to say the 'side-to-side' motion of the tower, as illustrated by the second mode M2 on FIG. 2. To do this, it receives as an input the lateral damping signal 74 from the central control module 52 that also provides data to the lateral motion torque damping module 66, and then calculates the pitch adjustments needed to each of the blades individually, and on a cyclical basis, to result in the rotor applying a sideways force that is counter to the sideways motion of the tower. The module 68 outputs three separate pitch offset values as separate command signals that are shown here as $P_{OFFSET\_1}$, $P_{OFFSET\_2}$ and $P_{OFFSET\_3}$. These command signals are then fed into the pitch control system 36.

As will be now appreciated from the above discussion, the pitch control system 36 receives the modulated collective pitch demand $P_{COLL\_DEM}$ from the speed controller 54 and also receives the three pitch offset values $P_{OFFSET\_1}$, $P_{OFFSET\_2}$ and $P_{OFFSET\_3}$ from the lateral motion damping module 68. The pitch control system 36 combines the aforementioned signals and outputs three separate signals to the pitch actuators 65, in order to adjust the pitch angles of each of the blades. The pitch adjustment angle values $P_{ADJ\_1}$, $P_{ADJ\_2}$, and $P_{ADJ\_3}$, as mentioned above, therefore are modulated by the pitch control system 36 so as to factor in the offset values $P_{OFFSET\_1}$, $P_{OFFSET\_2}$ and $P_{OFFSET\_3}$ from the lateral motion pitch adjustment module 66. The pitch actuation system 36 therefore controls the blades of the wind turbine 6 in accordance with the adjustments determined by the damping controller 64.

The above discussion has explained the functionality of the damping controller 40 to modulate the torque demand to the generator and also the pitch of the blades in order to generate axial and sideways forces. It will therefore be appreciated that the damping controllers 40 on respective ones of the wind turbines 6 can be controlled to achieve various effects. For example, the damping controllers of the wind turbines could be controlled to generate and axial form on the tower that counters the sway of the tower, thereby reducing the stress on the tower. Also, the damping controllers could be controlled to generate torsion on the yaw units 12 where the support arms 14 are mounted to the tower 4, that is to say the wind turbines on the right hand side of the tower could be controlled to generate an axial force in one direction, and the wind turbines on the left hand side of the tower 4 could be controlled to generate an axial force in the opposite direction. This could be used to assisting yawing of the support arms about the tower.

Central Control of Active Damping

The above discussion has focussed on how the individual wind turbines 6 are controlled by the respective local control modules 50 and, more specifically, the damping controllers 54, to exert axial and lateral forces that may be used to counteract modes of oscillation of the wind turbines 6 and the tower 4. It is the responsibility of the central control module 52 to monitor the movement of the tower 4 and support arm arrangement 10 and to determine what damping inputs are required at each of the wind turbines 6 in order to counteract the detected oscillations.

Figure 5:
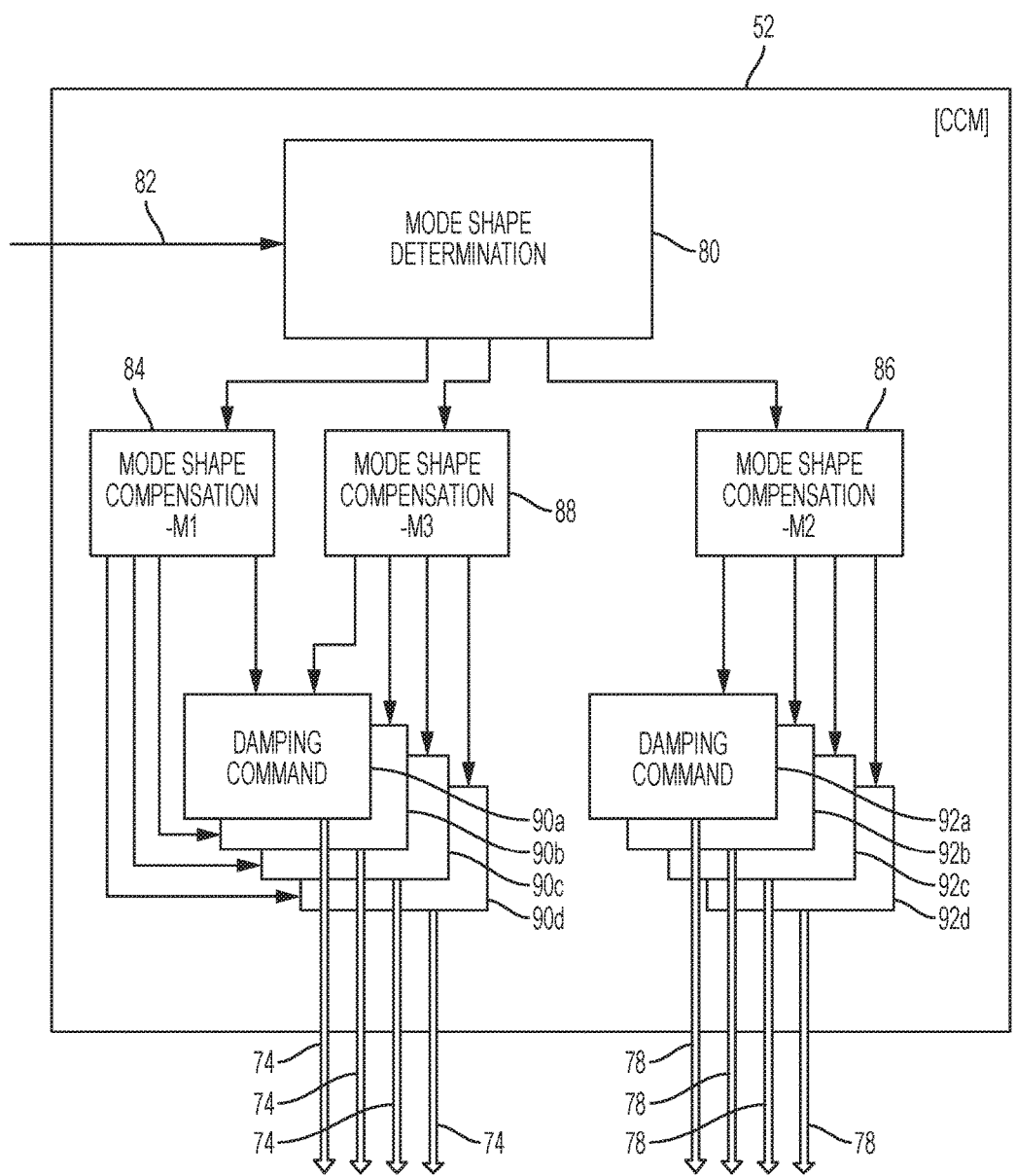
FIG. 5 is a schematic view of a control function of the central control system in FIG. 3.

FIG. 5 illustrates an embodiment of the central control module 52 that is operable to monitor the oscillations of the tower and provide suitable damping control commands to the individual wind turbines.

The central control module (CCM) 52 includes a mode shape determination module 80 that receives at an I/O interface 82 inputs data relating to the oscillations of the tower 4. For example, the tower may be equipped with vibration detection means in the form of various sensor systems that are configured to measure the amplitude and frequency of vibration of the tower. The sensor systems could comprise for example a set of one or more accelerometers located at suitable points on the tower structure, or a set of one or more load sensors (e.g. optical-based or electronic strain gauge type) that measure deflections directly. It is within the capabilities of the skilled person to select the appropriate sensor for the vibration detection task at hand.

The mode shape determination module 80 processes the data to determine the amplitude and frequency of the mode shapes M1, M2 and M3 as shown in FIG. 2. It will be appreciated that other, more complex, vibratory modes may exist, but that this description has been simplified for ease of understanding.

Once the amplitude and frequency of oscillation at the predetermined mode shapes have been determined, the mode shape determination module 80 passes the information into respective mode shape compensation modules 84, 86, 88, which comprise one module for each of the known mode shapes M1, M2 and M3.

The mode shape compensation modules 84, 86, 88 then pass data to damping command modules. Here, there are two groups of damping command modules. A first set of damping command modules 90a-90d receive data inputs from the M1 mode shape compensation module an the M3 mode shape compensation module, whilst a second group of damping command modules 92a-92d receive data input from the M2 mode shape compensation module 88.

The first group of damping command modules 90a-90d are operable to receive data relating to the frequency and amplitude of oscillations in the M1 and M3 mode shapes, that is the axial sway of the wind turbine as well as the way the tower 4 yaws about is axis, and to determine appropriate first damping control commands 74 to send to each of the wind turbines 6 as input signal 74. As mentioned above, the first damping control command 74 is received by the axial motion pitch damping module 70 of the damping controller at each respective local control module 50 which causes pitch angle changes to be made collectively at the pitch control system 36.

The second group of damping command modules 92a-92b are operable to receive data relating to the frequency and amplitude of oscillations in the M2 mode shape, that is to say the side to side movement of the tower 4 and to determine the appropriate second damping control commands to send to each of the wind turbines 6 as input signal 78. As discussed above, the second damping control command is received by the lateral motion torque damping module 66 and the lateral motion pitch damping module 68 at each of the local control modules 50. The lateral motion torque damping module 66 then makes suitable adjustments to the torque demand that is provided at the converter system 34 and the lateral motion pitch damping module 68 makes necessary cyclic adjustments to the blade pitch in order to generate suitable lateral forces at the wind turbines 6 to counteract the measured oscillations.

The process described above is proposed to be a continuous process in that the vibrations of the support structure are monitored constantly and suitable active damping control measures are taken by the individual wind turbines 6 to reduce the vibrations. However, it should be noted that appropriate thresholds may be put in place that will be triggered if the oscillations are too great that damping will be inadequate to the vibrations to an acceptable level, and/or that the vibrations have been at a level for too long a period of time. In such circumstances, triggering of the thresholds may cause the speed of the one or more of the wind turbines to be varied or the wind turbines may be shut down. This may occur in high wind situations for example. Appropriate thresholds could also be implemented to ensure that damping is not performed in circumstances where oscillation of the structure is not high enough to require damping.

The skilled person will appreciated that modifications may be made to the specific embodiments described above without departing from the inventive concept as defined by the claims.

For example, although in the embodiment of FIG. 3 the local control units 50 are shown as being located within the nacelles 23 of the wind turbines 6, this need not be the case, and embodiments are envisaged in which the local control units are mounted in different locations, for example on the support arms 13 close to the support structure 4. This may provide the local control units 50 in a more convenient position for maintenance access.

A model of structural correlations may be implemented into the local controller, the central controller, or in a distributed manner. The structural model may advantageous be a dynamic model to take into account that an actuation at one wind turbine module may have an effect at other wind turbine modules since the wind turbine modules are coupled via the support structure.

In an embodiment a damping control command for one wind turbine takes into account at least one damping control command for another wind turbine. The correlation between the damping command of one wind turbine with any other wind turbine may be defined by the structural model.

As an example, damping of vibrations of a lower pair of wind turbines may induce vibrations of an upper pair of wind turbines. This may be avoided by also generate damping commands for the upper pair of wind turbines based on an expected correlation defined by the structural model.

Also, it should be appreciated that although the illustrated embodiment includes four wind turbines mounted to the support structure, the active damping system of the invention may be applied to wind turbine systems with more than four wind turbines. Moreover, embodiments are envisaged in which the wind turbines are not paired in groups of two, as in the illustrated embodiment, but are arranged differently and not necessarily having a co-planar relationship.

In the above wind turbine system 2, the central control unit 52 is operable to determine frequency and amplitude of vibrations in the first, second and third mode shapes. It should be noted that these mode shapes have been used here by way of example only, and that other perhaps more complex mode shapes may exist. Accordingly, the central control module 52 may also be adapted to calculate the necessary compensation to counteract the vibrations measured in these more complex mode shapes.

The invention claimed is:

1. A wind turbine system comprising:
a plurality of wind turbines collectively mounted to a same support structure including a tower, wherein each of the plurality of wind turbines includes:
a rotor;
a power generation system driven by the rotor; and
one or both of a pitch control system and a local controller configured to control power generated by the power generation system,
wherein the wind turbine system further comprises a central controller configured to:
receive vibration data for a measured vibration of the support structure; and
determine a damping control command for at least one of the plurality of wind turbines,
wherein each of the plurality of wind turbines further includes a damping controller that is communicatively coupled with the central controller, the damping controller configured to:
receive the damping control command; and
apply a damping control input to one or both of the pitch control system and the local controller to counteract the measured vibration of the support structure.

2. The wind turbine system of claim 1, wherein one or more of the plurality of wind turbines are configured to control the respective power generation system in order to damp a sideways vibration of the tower in a direction that is transverse to a wind direction.

3. The wind turbine system of claim 1, wherein each of the plurality of wind turbines further includes a respective plurality of blades connected to the rotor, and
wherein one or more of the plurality of wind turbines are configured to collectively control a pitch of the respective plurality of blades to damp a vibration of the tower in a direction substantially in line with a wind direction.

4. The wind turbine system of claim 1, wherein each of the plurality of wind turbines further includes a respective plurality of blades connected to the rotor, and
wherein one or more of the plurality of wind turbines are configured to cyclically control a pitch of each of the respective plurality of blades to damp a vibration of the tower in a direction that is transverse to a wind direction.

5. The wind turbine system of claim 1, wherein each of the plurality of wind turbines is coupled to the tower by a support arm of the same support structure,
wherein each of the plurality of wind turbines is spaced away from the tower, and wherein one or more of the plurality of wind turbines are configured to control a yawing force applied to the support arm.

6. The wind turbine system of claim 5, wherein the same support structure further comprises:
a first mount configured to yaw relative to a yaw axis of the tower,
wherein the support arm of a first wind turbine of the plurality of wind turbines extends from the first mount.

7. The wind turbine system of claim 6, wherein the support arm of a second wind turbine of the plurality of wind turbines extends from the first mount.

8. The wind turbine system of claim 6, wherein the first mount is arranged at a first tower height, wherein the same support structure further comprises:
a second mount configured to yaw relative to the yaw axis of the tower, wherein the second mount is arranged at a second tower height that is different than the first tower height,
wherein the support arm of a second wind turbine of the plurality of wind turbines extends from the second mount.

9. The wind turbine system of claim 5, wherein the same support structure further comprises:
a first yaw unit coupled to the support arm of a first wind turbine of the plurality of wind turbines,
wherein the first yaw unit is configured to yaw the rotor of the first wind turbine relative to the support arm.

10. The wind turbine system of claim 1, wherein the plurality of wind turbines are controlled according to a plurality of groups,
wherein one or more first wind turbines in a first group of the plurality of groups are positioned on a first side of the tower, and are controlled to generate a force along respective rotor axes of the one or more first wind turbines, and
wherein one or more second wind turbines in a second group of the plurality of groups are positioned on a second side of the tower opposite the first side, and are controlled to generate a force along respective rotor axes of the one or more second wind turbines that is less than, or that is opposite to, the force generated by the one or more first wind turbines.

11. The wind turbine system of claim 1, further comprising:
a vibration detection sensor located on the support structure and configured to provide the vibration data to the central controller.

12. The wind turbine system of claim 11, wherein the vibration detection sensor comprises one or both of: (i) a set of one or more accelerometers, and (ii) a set of one or more load sensors.

13. The wind turbine system according to claim 1, wherein the damping controller is further configured to:
generate the damping control input based on (i) the damping control command and (ii) one or more structural correlations between different wind turbines of the plurality of wind turbines,
wherein the one or more structural correlations describe effects of controlling one of the plurality of wind turbines on one more other wind turbines of the plurality of wind turbines.

14. The wind turbine system according to claim 13, wherein the one or more structural correlations are defined by a dynamic model of the wind turbine system.

15. The wind turbine system of claim 1, wherein a first damping controller of a first wind turbine of the plurality of wind turbines comprises:
a lateral motion torque damping module; and
an axial motion pitch damping module.

16. The wind turbine system of claim 15, wherein the first damping controller is configured to:
during above-rated power operating conditions for the first wind turbine, operate the axial motion pitch damping module to provide the damping control input from the damping controller; and
during below-rated power operating conditions for the first wind turbine, operate the lateral motion torque damping module to provide the damping control input from the damping controller.

17. The wind turbine system of claim 16, wherein the first damping controller further comprises:
a lateral motion pitch damping module,
wherein the first damping controller is further configured to, during the above-rated power operating conditions, operate the lateral motion pitch damping module to provide the damping control input from the damping controller.

18. A method of operating a wind turbine system comprising a plurality of wind turbines collectively mounted to a same support structure including a tower,
wherein each of the plurality of wind turbines includes a rotor, a power generation system driven by the rotor, and one or both of a pitch control system and a local controller configured to control power generated by the power generation system,
wherein the method comprises:
receiving, at a central controller communicatively coupled with the plurality of wind turbines, vibration data for a measured vibration of the support structure;
based on the received vibration data, determining a damping control command for at least a first wind turbine of the plurality of wind turbines; and
applying, using a damping controller of the first wind turbine and based on the damping control command, a first damping control input to the one or both of the pitch control system and the local controller to counteract the measured vibration of the support structure.

19. The method of claim 18, further comprising:
applying, using a damping controller of a second wind turbine of the plurality of wind turbines, a second damping control input to the one or both of the pitch control system and the local controller of the second wind turbine,
wherein the second damping control input is based on the first damping control input.

20. The method of claim 19, wherein applying the second damping control input comprises:
determining one or more vibrations that will be induced in the second wind turbine responsive to application of the first damping control input; and
determining the second damping control input to mitigate the one or more vibrations.

* * * * *